United States Patent [19]
Heberlein, Jr. et al.

[11] Patent Number: 4,991,050
[45] Date of Patent: Feb. 5, 1991

[54] METHOD AND DEVICE FOR PROTECTING STARTERS FROM FAULT CURRENTS

[75] Inventors: Gustave E. Heberlein, Jr., Delafield; Terrance D. Nelson, Cudahy, both of Wis.

[73] Assignee: Allen-Bradley Company, Inc., Milwaukee, Wis.

[21] Appl. No.: 408,900

[22] Filed: Sep. 18, 1989

[51] Int. Cl.[5] .................... H02H 9/02

[52] U.S. Cl. .................... 361/57; 361/31; 361/99; 361/93; 318/789

[58] Field of Search .................... 361/23, 31, 32, 34, 361/93, 56, 55, 99, 57, 30; 318/782, 789, 790

[56] References Cited

U.S. PATENT DOCUMENTS

| | | | |
|---|---|---|---|
| 1,762,604 | 6/1930 | Ainsworth . | |
| 1,958,159 | 5/1934 | Bresson . | |
| 2,821,594 | 1/1958 | Latour . | |
| 3,092,699 | 6/1963 | Latour . | |
| 3,238,326 | 3/1966 | Frey . | |
| 3,558,910 | 1/1971 | Dale | 307/134 |
| 3,783,305 | 1/1974 | Lefferts | 307/136 |
| 3,868,549 | 2/1975 | Schaefer et al. | 307/136 |
| 3,887,888 | 6/1975 | Bayles et al. . | |
| 4,001,738 | 1/1977 | Terracol et al. | 335/16 |
| 4,445,079 | 4/1979 | DeFilippis et al. | 318/789 |
| 4,467,301 | 8/1984 | Goodrich | 335/195 |
| 4,511,774 | 4/1985 | Forsell | 200/147 R |
| 4,513,267 | 4/1985 | McClellan et al. | 335/16 |
| 4,630,014 | 12/1986 | McClellan et al. | 335/16 |
| 4,633,207 | 12/1986 | McClellan et al. | 335/16 |
| 4,745,511 | 5/1988 | Kugelman et al. | 361/8 |
| 4,760,483 | 7/1989 | Kugelman et al. | 361/13 |
| 4,788,415 | 11/1988 | Whipple, Jr. | 219/508 |

OTHER PUBLICATIONS

Asco Controls Bulletin, Automatic Switch Co., "Withstand Circuit Ratings for Asco Transfer Switches", p. 3, 1982.

*Primary Examiner*—Todd E. Deboer
*Attorney, Agent, or Firm*—Quarles & Brady

[57] ABSTRACT

An apparatus for protecting the fault current intolerant elements of a motor starter circuit or the like is comprised of a protective shunt which bypasses the fault current intolerant elements in response to the detection of high fault currents. The protective shunt is formed of a "U" shaped conductor which flexes in response to the magnetic field created by the flow of the high fault currents through the "U" shaped conductor. Electrical contacts place on one leg of the "U" shaped conductor and on a stationary conductor form a shunting switch which conducts high fault currents around the starter circuitry. In a second embodiment, the stationary conductor is replaced with a flexible conductor which carries an armature. The magnetic armature is attracted by a focussed magnetic field from a magnetic yoke positioned around one leg of the "U" shaped conductor.

4 Claims, 3 Drawing Sheets

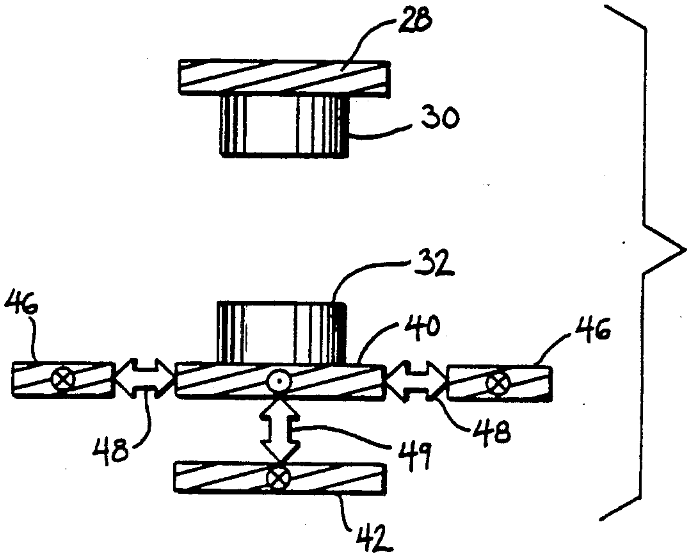
FIG. 3a
FIG. 3b
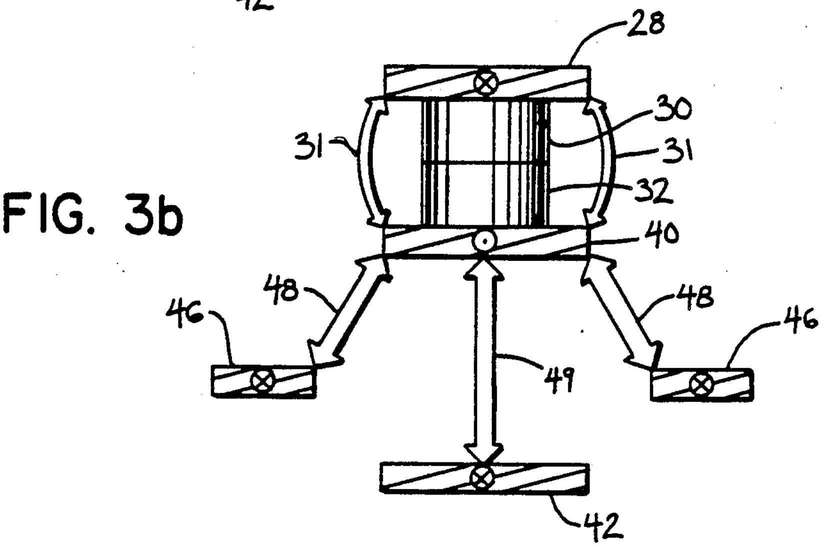
FIG. 5
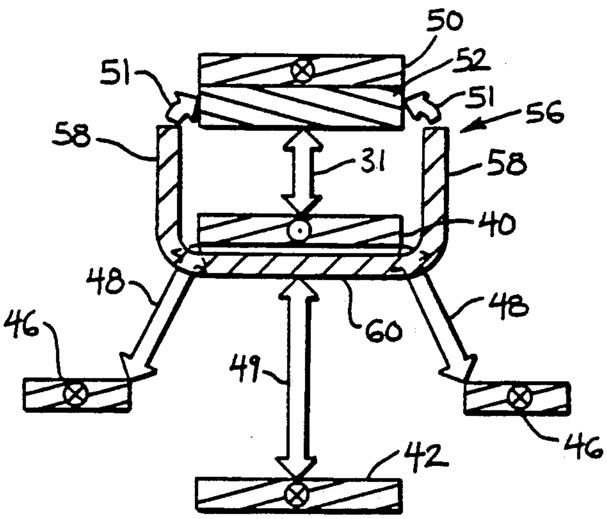

METHOD AND DEVICE FOR PROTECTING STARTERS FROM FAULT CURRENTS

BACKGROUND OF THE INVENTION

1. Field of the Invention

The field of the invention is short circuit or fault current protection devices, and more particularly, circuits for protecting motor starters and the like from damage due to fault currents.

2. Background Art

The control circuitry for large electrical motors typically includes a starter consisting of a contactor and an overload relay. When closed, the contactor contacts permit the flow of current to the motor. The overload relay monitors the current to the motor and opens the contactor when necessary to safeguard the motor against overheating as may result when the motor is overloaded.

A typical overload relay is comprised of a heater and a thermal actuator such as a bimetallic strip or eutectic element. The heater reproduces, on a lesser scale, the heating of the motor itself and when a certain temperature is reached, the thermal actuator opens the overload relay contacts which in turn causes the contactor contacts to open and interrupt current to the motor.

It is known to place a circuit breaker or fuse in series with the starter to interrupt short circuit currents flowing through the starter. Circuit breakers are typically more complex than contactors and, like fuses, may handle such high short circuit currents.

Nevertheless, in the event of short circuit, the current through the contactor contacts and overload relay may exceed by twenty times or more the normal operating currents for those devices. This may occur if the current trip point of the circuit breaker or fuse is too high, or if sufficient energy is transmitted to the starter as a result of "let-through" current passed by the arc generated as the circuit breaker or fuse interrupts the circuit.

Under such high short circuit currents, the contactor contacts experience an electrodynamic "blow apart" force tending to open the contacts against the force of their actuator. When the contacts open, the high currents can cause arcing and pitting of the contact surfaces, destroying the operability of the contactor. The high currents can also damage the heater element of the overload relay. Hereinafter, the elements of a starter, or other such devices, that are subject to damage from the high current levels associated with a short circuit will be termed "fault current intolerant elements".

SUMMARY OF THE INVENTION

The present invention uses a high speed protective shunt to protect the fault current intolerant elements of a starter or other device. The protective shunt includes a current sensing element for detecting current flow through the fault current intolerant elements and a protective shunting switch that is activated by the current sensing element for conducting current around said fault current intolerant elements when the current through these elements rises above a predetermined level. A circuit interrupting element in series with the protective shunt and the fault current intolerant elements then interrupts current flow through both the protective shunt and the fault current intolerant elements.

It is thus an object of the invention to reduce damage to the fault current intolerant elements during a high short circuit current condition. The closed protective shunting switch conducts current around the fault current intolerant elements eliminating current induced damage.

It is a further object of the invention to provide a protection device that is easily reset. When the current flow returns to normal levels, the protective shunting switch returns to its normally open condition. Upon correction of the fault condition and resetting of the circuit interrupting element, the protective shunt is ready to protect against possible future faults.

The protective shunt consists of a "U" shaped conductor whose legs flex outward as a result of the magnetic forces produced when a current of sufficient magnitude passes through the legs. A first leg of the "U" shaped conductor is tied to the protective shunt's nonconductive housing, while the outer surface of the second leg holds a first electrical contact. When the legs of the "U" shaped conductor flex apart, the first contact touches a second contact closing the protective shunting switch.

Another object of the invention, therefore, is to produce a simple current activated protective shunting switch. The dimensions of the "U" shaped conductor may be adjusted to accurately control the forces acting on the conductor legs at a given current level and hence to control the switching point of the shunting switch. Higher short circuit currents produce proportionally stronger contacting forces overcoming the increasing blow apart forces produced by the current flowing thorough the contacts themselves.

In a second embodiment, a magnetic yoke is positioned over the second leg of the "U" shaped conductor containing the first contact, and a magnetic armature is connected to a flexible conductor containing a second contact. The magnetic yoke focuses the magnetic field created by current flow through the second leg of the "U" shaped conductor toward the magnetic armature, attracting the magnetic armature, increasing the closing force on the shunting switch and flexing both the second leg of the "U" shaped conductor and the flexible conductor carrying the second contact.

It is yet another object of the invention to produce a rapid-action current sensitive shunt. By increasing the shunt contact closing force through the use of the magnetic yoke and armature and the closing speed of the shunting switch is increased.

It is another object of the invention to provide a current sensitive switch with a positive switching action. In the open state, the second leg of the "U" shaped conductor may be coplanar with a bifurcated return conductor carrying current in the opposite direction. When the second leg of the conductor is flexed away from the plane of the return conductors, the repulsive forces between the returns and the second leg of the "U" shaped conductor add together to accelerate the flexure of the second leg of the "U" shaped conductor. This additional force assists the switching action.

Other objects and advantages besides those discussed above shall be apparent to those experienced in the art from the description of a preferred embodiment of the invention which follows. In the description, reference is made to the accompanying drawings, which form a part hereof, and which illustrate two examples of the invention. Such examples, however, are not exhaustive of the various alternative forms of the invention, and therefore reference is made to the claims which follow the description for determining the scope of the invention.

BRIEF DESCRIPTION OF THE DRAWINGS

FIG. 1(*b*) is a schematic diagram showing the placement of the protective shunt of the present invention with respect to a motor starter circuit and two circuit interrupting elements;

FIG. 3(*a*) is a sectional view along the plane indicated by line 3—3 of FIG. 2, of the protective shunt of FIG. 1 in an open position;

FIG. 3(*b*) is a sectional view along the plane indicated by line 3—3 of FIG. 2, of the protective shunt of FIG. 1 is a closed position;

FIG. 5 is a sectional view along the plane indicated by line 5—5 of FIG. 4, of the protective shunt of FIG. 4 in an closed position.

DETAILED DESCRIPTION OF THE PREFERRED EMBODIMENT

Figure 1A:
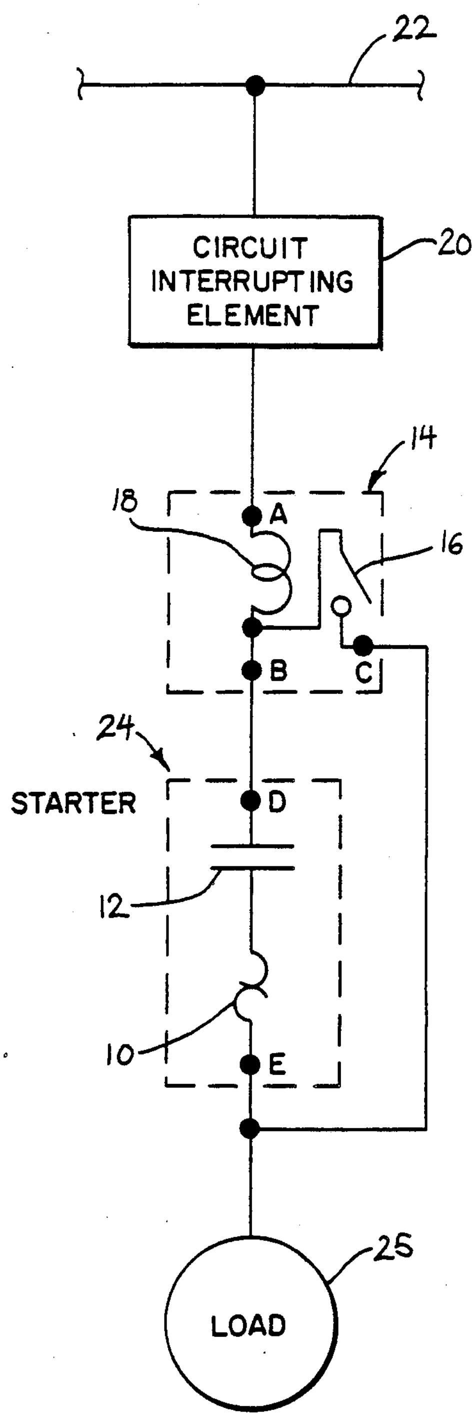
FIG. 1(*a*) is a schematic diagram showing the placement of the protective shunt of the present invention with respect to a motor starter circuit and a single circuit interrupting element.
Figure 1B:
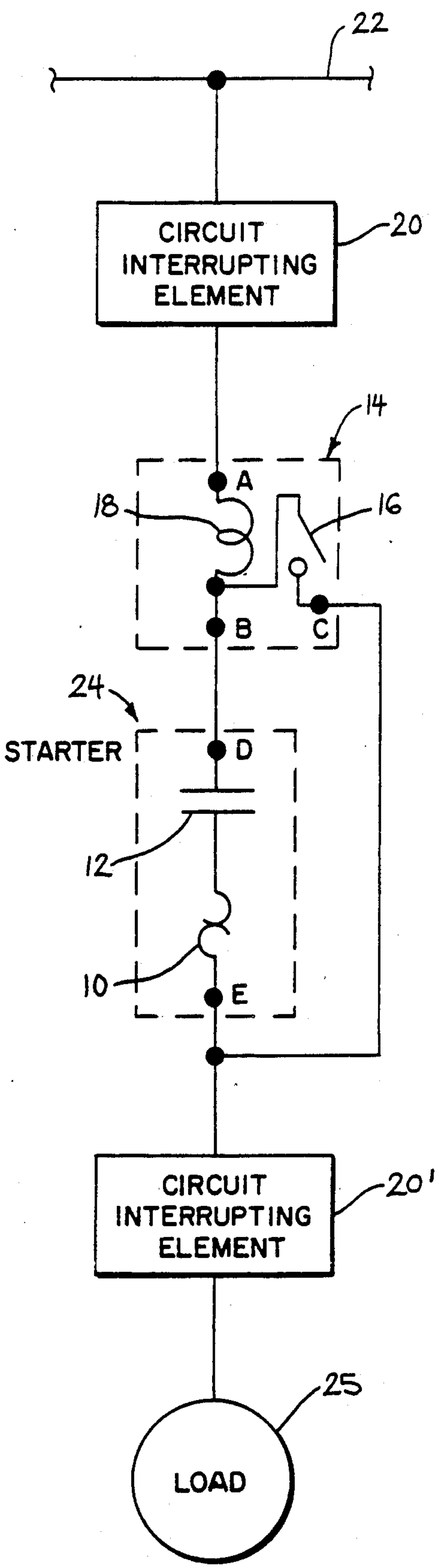

Referring to FIG. 1, a single line diagram of a motor control circuit is shown incorporating the invention and including a circuit interrupting element 20, such as a fuse or circuit breaker, connected between a power feed 22 and a first terminal A of a protective shunt 14. A low resistance current sensing element 18 within the overcurrent shunt 14 conducts current from terminal A of the protective shunt 14 to terminal B of the over current shunt 14.

Terminal B of the protective shunt 14 is connected to one contact of a protective shunting switch 16 to be described below, and to a line terminal D of a motor starter 24 comprised of series connected contactor contacts 12 and thermal overload relay 10. The contactor contacts 12 and the thermal overload relay 10 are sized according to the horsepower of the motor to be controlled. Thermal overload relays and contactors suitable for use with the present invention are available on a commercial basis.

The load terminal E of the motor starter circuit is connected to the load 25 which may be, for example, motor windings.

During normal operation of the motor, current flows from the power feed 22 through the current sensing element 18 of the protective shunt 14, through the contactor contacts 12 and the thermal overload relay 10 to the load 25.

Terminal B of the protective shunt 14, as mentioned above, is also connected to one contact of a normally-open protective shunting switch 16. The other contact of the protective shunting switch 16 is connected to a terminal C of the protective shunt 14. The current sensing element 18 causes the protective shunting switch 16 to close when a fault current level, typically on the order of twenty times the normal operating current level, flows through the current sensing element 18. Currents of this magnitude generally indicate a short circuit in a motor winding.

Terminal C is connected to the load terminal E of the motor starter circuit 24 so that when the protective shunting switch 16 is closed, a shunt current path is created around the motor's starter circuit 24. The shunt current path is of sufficiently low resistance that essentially all of the fault current flows through the shunt current path rather than through the motor starter circuit 24. This protects the contactor contacts 12 and overload relay 10 from fault current, the associated blow apart forces, damaging contact arcing, and excessive heat energy.

It should be noted that motor overload currents, as distinguished from fault currents, will not trigger the protective shunting switch 16. Overload currents are additional currents resulting from physical loading of the motor which causes it to consume additional power and current. Such overload conditions are handled by the overload relay 10.

Referring to FIG. 1(*b*), an alternative embodiment of the invention includes a second circuit interrupting element 20' connected in series between terminal E of the starter circuitry 24 and the load 25. In a fault condition, when the protective shunting switch 16 is closed, the impedance of the motor control circuit measured between terminal A of the protective shunt 14 and the load 25, is substantially reduced. This lower impedance increases the current that must be interrupted by the first circuit interrupting element 20. The second circuit interrupting element 20' is included to share the burden of interrupting the fault current flow with the first circuit interrupting element 20 thus reducing the peak current and heat energy received by each circuit interrupting element.

The first circuit interrupting element 20 will generally be a fuse or circuit breaker whereas the second circuit interrupting element is preferably a "blow off" contact. It will be apparent to one skilled in the art, however, that other such circuit interrupting devices may be substituted for the first and second circuit interrupting elements 20 and 20' respectively.

Figure 2:
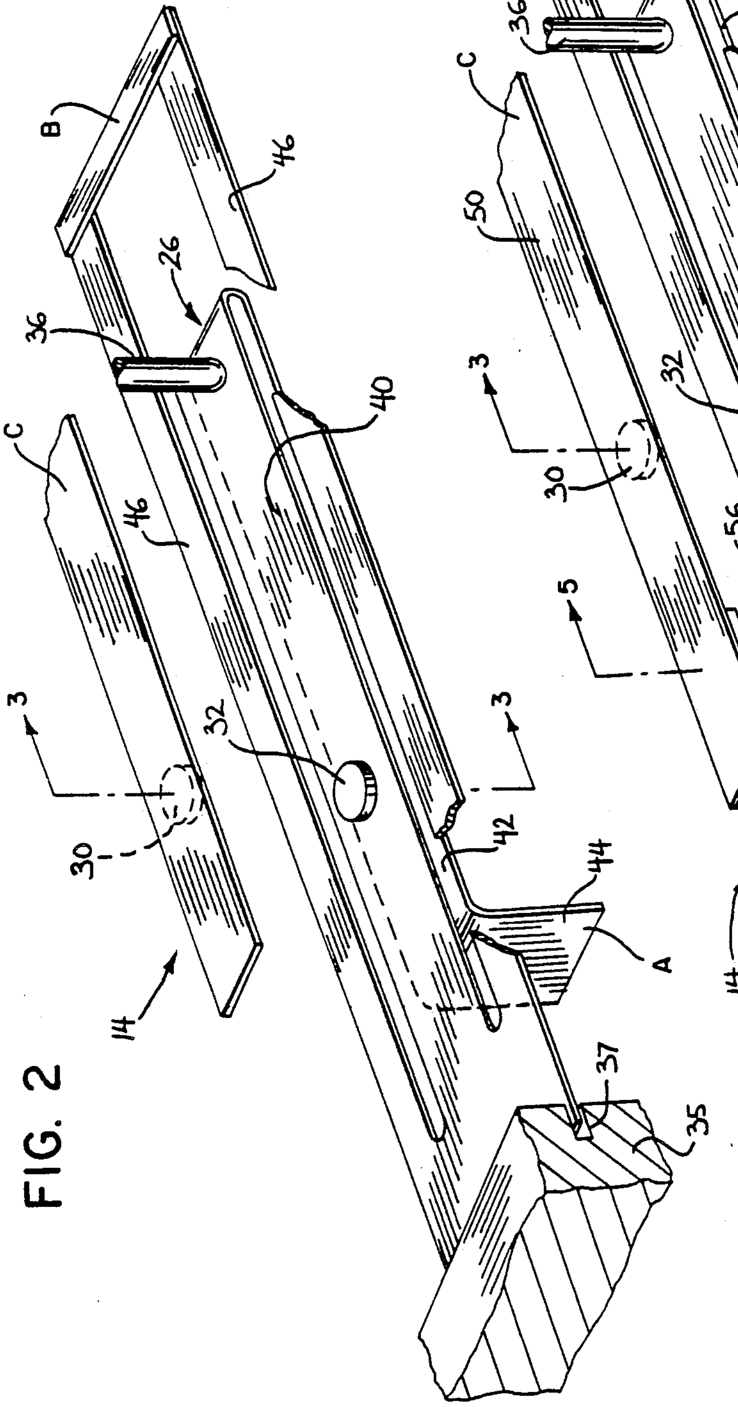
FIG. 2 is perspective view of the protective shunt of FIG. 1 with the insulated housing and portions of the return conductor removed for clarity.

Referring to FIG. 2, the protective shunt 14 is comprised of a "U" shaped conductor 26 formed of a thin band of beryllium copper approximately 0.4 mm (0.016 inches) thick. Beryllium copper is chosen to provide both low electrical resistance and the necessary "springiness" or resilience to resist flexure, as will be described below. It will be understood from the following discussion that other materials such as chromium copper alloys could also be used for the "U" shaped conductor. A lower leg 42 of the "U" shaped conductor 26 terminates in a tab 44 at a right angle to the lower leg 42. The tab 44 serves to attach the "U" shaped conductor 26 to a non-conductive housing (not shown) and forms terminal A of the protective shunt 14. Lower leg 42 is prevented from moving downward by one wall of the non-conductive housing (not shown).

An insulating guide member 36, positioned against the upper surface of the upper leg 40 of the "U" shaped conductor 26, near the point where the upper leg 40 joins with the lower leg 42, restrains the base of the "U" shaped conductor 26 against upward travel. On the upper surface of the upper leg 40, removed from the insulating guide member 36 and near the center of the upper leg 40 is a contact 32 formed of silver-graphite.

The remaining end of the upper leg 40 is joined to a bifurcated return conductor 46 which doubles back within the plane of the upper leg 40 on either side of the upper leg 40. The return conductor 46 is also constructed of beryllium copper and preferably is fabricated from the same strip of metal as is the "U" shaped conductor 26. The remaining ends of the return conductor 46 form terminal B of the protective shunt 14 and are also attached to the non-conductive housing. The junction of the return conductor 46 and the upper leg 40 is held slidably within a slot 37 in one portion of the non-conductive housing 35 thereby preventing upward motion or downward motion of the return conductor 46 and the associated end of the upper leg 40. The upper leg 40 is thus restrained at each of its ends, but is free to flex away from the lower leg 42 by bowing at its center where the contact 32 is mounted.

Positioned directly above the contact 32 is a second contact 30 formed of silver tungsten and affixed to the lower surface of a stationary conductor 28. It will be understood to those skilled in the art that other contact materials could be used for the first and second contacts 32 and 30 respectively. The stationary conductor is affixed to the non-conductive housing to form terminal C of the protective shunt 14.

Referring to FIG. 3(*a*), when the current between terminal A and B of the protective shunt 14 (as shown in FIG. 2) is less than a fault current, contacts 32 and 30 are separated by an air gap of approximately 0.75 mm (0.03 inches). The current in upper leg 40 flows in the opposite direction as the current in lower leg 42 and in return conductor 46. Accordingly magnetic forces of repulsion 49 and 48 are established between upper leg 40 and lower leg 42 and between upper leg 40 and the flanking return conductor 46 respectively. However, at currents lower than a fault current, the forces 49 exerted between the upper leg 40 and lower leg 42 of the "U" shaped conductor 26 are too low to overcome the spring force of the "U" shaped conductor 26 and thus the upper leg 40 remains essentially coplanar with the flanking return conductor 46. Also, the directly opposing forces indicated by arrows 48 are exerted by the bifurcated flanking return conductor 46 against the upper leg 40 and are thus canceled out or ineffective.

When a fault current passes through the "U" shaped conductor 26, increased force 49 between the upper and lower leg 40 and 42, flexes the upper leg 40 upward until contact 32 touches contact 30, as shown in FIG. 3(*b*). Also when the upper leg 40 is no longer coplanar with the return conductor 46, the forces indicated by arrows 48, exerted by the return conductor 46, are no longer opposing but instead exert a net force which assists, or adds, to the closing force indicated by arrow 49. When contact 32 and 30 meet, current flowing through the "U"-shaped conductor 26 flows into the stationary conductor 28 and hence to terminal C of the protective shunt 14. The accompanying increase of current flow due to the shorting out of the starter 24 produces an increase in the force 49 exerted on the upper leg 40. This force is sufficient to hold contacts 32 and 30 together even though they have their own repelling electrodynamic "blow apart" forces 31 and the "U" shaped conductor length is reduced.

Figure 4:
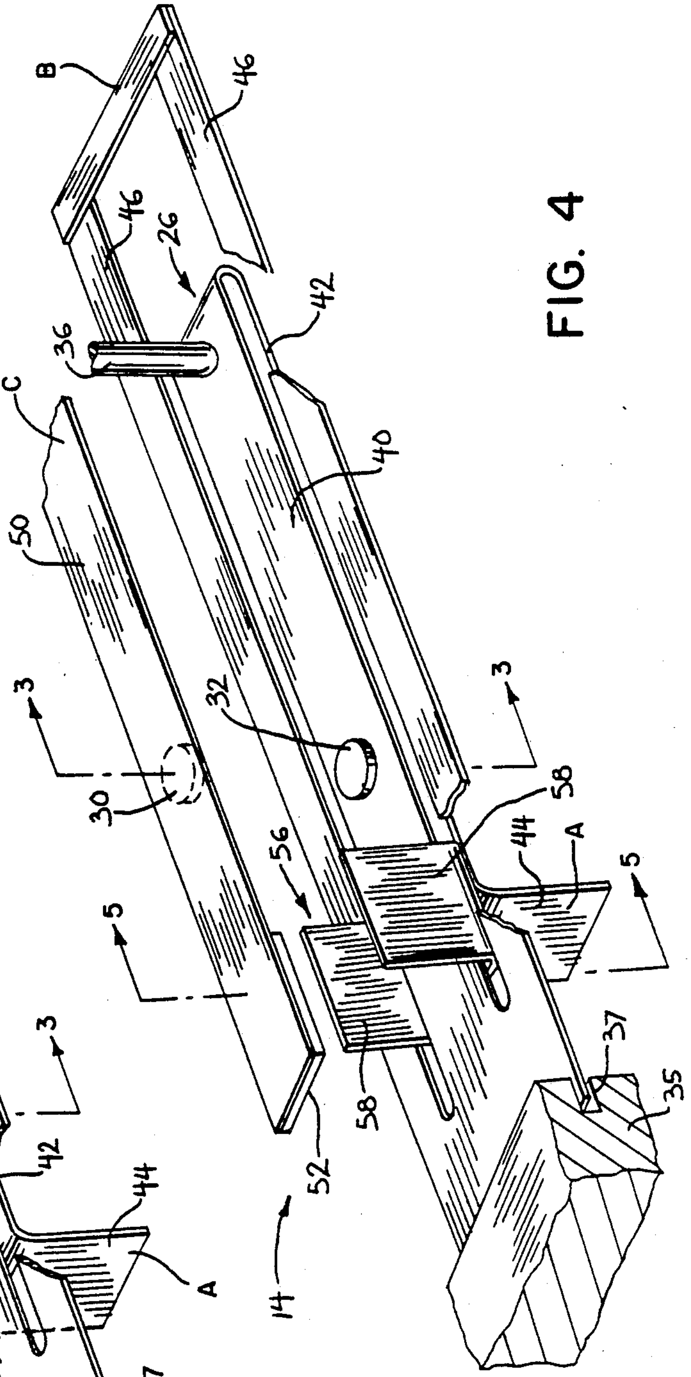
FIG. 4 is perspective view similar to that of FIG. 2, of an alternate embodiment of the protective shunt of FIG. 1 which includes a magnetic yoke and armature.

Referring to FIG. 4, in a second embodiment of the invention the stationary conductor 28 is replaced with a flexible conductor 50, constructed, as is the "U" shaped conductor 26, of a band of beryllium copper and positioned above the upper leg 40 parallel to the plane of the upper leg 40 when both are unflexed. Affixed to the bottom surface of the flexible conductor 50 is a contact 30, aligned with contact 32 on the upper leg 40. One end of the flexible conductor 50 forms the terminal C and is affixed to the non-conducting housing. The other end of the flexible conductor 50 is free to flex toward the upper leg 40 and has attached to its bottom surface a steel armature 52.

As shown best in FIG. 4 and 5, when the flexible conductor 50 flexes downward toward the upper leg 40, the armature 52 is received between the upward extending pole pieces 58 of a "U" shaped magnetic yoke 56. The vertical pole pieces 58 are connected together by a yoke base 60 which fastens to the bottom surface of the upper leg 40. The pole pieces 58 rise on either side of the upper leg 40 in the gap between the upper leg 40 and the return conductor 46.

The magnetic yoke 56 thus wraps partially around the upper leg 40 and focuses the magnetic field generated by current passing through the upper leg 40 toward the magnetic armature 52.

During the occurrence of a fault, the fault current creates a magnetic field that attracts the armature 52, whose steel is ferromagnetic, providing an attractive force indicated by arrows 51 which aids in closing contacts 30 and 32. The ability of the flexible conductor 50 to flex toward the upper leg 50 during a fault current further improves the switching speed of the protective shunt 14.

When the load has three phases, such as a three phase motor, the forgoing circuit and over-current shunt will be repeated for each leg of a three phase circuit.

It will be understood by one skilled in the art, that the level of current necessary to activate the protective shunt 14 may be adjusted by changing the geometry and material of the shunt 14. For example, the fault current necessary to activate the protective shunt 14 may be reduced by decreasing the spring constant of the flexible conductor 52 or the "U" shaped conductor 26 or by decreasing the distance between the contacts 32 and 30 or by increasing the leg length of the "U" shaped conductor 26.

It will occur to those who practice the art that many modifications may be made to the preferred embodiments described above without departing from the spirit and scope of the invention.

We claim:

1. In a series circuit including fault current intolerant elements and a circuit interrupting means activated by a current above a predetermined level, the improvement which comprises:

a current sensing means for detecting current flow through the fault current intolerant elements; and a protective shunting switch means connected in parallel with the fault current intolerant elements and in series with the circuit interrupting means and being responsive to the current sensing means for conducting current around said fault current intolerant elements prior to the current through the fault current intolerant elements rising above the predetermined level.

2. The apparatus of claim 1 in which the fault current intolerant elements are elements of a motor starter.

3. The apparatus of claim 1 wherein the protective shunting switch ceases conducting current around said fault current intolerant elements subsequent to the current through the fault current intolerant elements falling below the predetermined level.

4. In a series circuit including fault current intolerant elements and a first circuit interrupting means activated by a current above a predetermined level, the improvement which comprises:

a current sensing means for detecting current flow through the fault current intolerant elements;

a protective shunting switch means connected in parallel with the fault current intolerant elements and in series with the first circuit interrupting means and being responsive to the current sensing means for conducting current around said fault current intolerant elements prior to the current through the fault current intolerant elements rising above the predetermined level; and a second circuit interrupting means connected in series with both the first circuit interrupting means and the protective shunting switch means for interrupting the current when the current through the second circuit interrupting means rises above the predetermined level.

* * * * *